March 7, 1967  P. E. HATFIELD  3,307,854
HIGH PRESSURE CLOSURE
Filed June 11, 1964
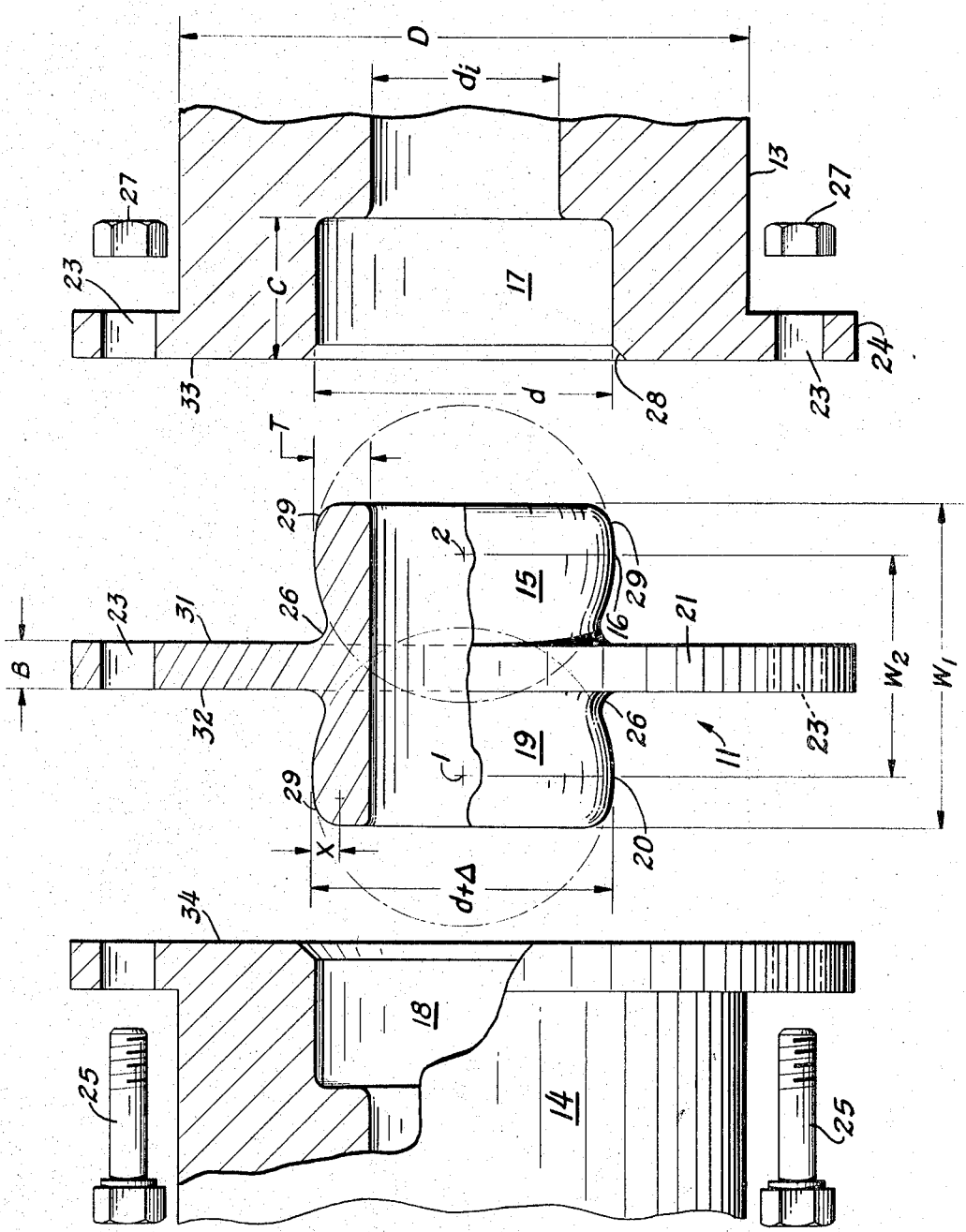
INVENTOR.
PAUL E. HATFIELD
BY David M. Burnell
his Agent ়
United States Patent Office 3,307,854
Patented Mar. 7, 1967

3,307,854
HIGH PRESSURE CLOSURE
Paul E. Hatfield, Beaver, Pa., assignor to Koppers Company, Inc., a corporation of Delaware
Filed June 11, 1964, Ser. No. 374,454
1 Claim. (Cl. 277—236)

This invention relates generally to mechanical closures for sealing pressure joints and, more specifically, to a self-sealing reinforced closure for joints which are subjected to high operating pressures.

In the operation of modern industrial processes such as the polymerization of ethylene at high pressures, there is often encountered pressures in excess of 40,000 pounds per square inch. The sealing of joints against leakage where these extremely high pressures are involved is a difficult problem, particularly in piping and tubing having bores above $3/16$ of an inch diameter. Many of the available closures such as those utilizing gaskets which are completely confined in grooved seats require almost perfect alignment of all the component parts to achieve proper sealing. Other closures which utilize a radially unsupported ring as the sealing member permit some misalignment of the component parts but require a high coupling force to be placed on the joint and have a further disadvantage in that the radially unsupported ring sometimes fails at high pressure and flies out from between the two joined members creating a safety hazard.

In accordance with this invention there is provided a high pressure self-sealing closure comprising a pair of cylindrical sockets located in the ends of the members to be joined and a closure ring adapted to fit into the sockets having a substantially cylindrical bore and a pair of spherical seating surfaces comprised of two substantially spherical segments which are connected to each side of an integral reinforcing ring by a pair of curved fillets. The diameter of the closure ring at the crest of the spherical seating surfaces is slightly larger than the diameter of the sockets such that when the segments are assembled in the sockets an interference seal is created between the surfaces of the sockets and the sealing surface of the closure ring.

The above and further objects and novel features of the invention will appear more fully from the following detailed description when the same is read in connection with the accompanying drawing. It is to be expressly understood, however, that the drawing is not intended as a definition of the invention but is for the purpose of illustration only.

The drawing illustrates an exploded view of the novel closure with parts broken away.

In the polymerization of ethylene at high pressures, for example as shown in U.S. Patent 3,023,202 to Schappert, the polymerization is carried out in a series of pipes or tubes. The joints between these pipes are subjected to pressures in excess of 40,000 p.s.i.g. and heretofore unless perfect alignment of the closures between the pipes is maintained the joints leak or even fail. This problem is avoided by the use of the novel closure of this invention.

Referring now to the drawing. The inside diameter of closure ring 11 is the same as the inside diameter $d_1$ of pipes 13 and 14. Spherical seating segment 15 fits into socket 17 of pipe 13. Similarly, spherical segment 19 fits into socket 18 of pipe 14. Closure ring 11 has an integral reinforcing ring 21 located between the two spherical segments 15 and 19 and connected to the segments by fillet portions 26. Advantageously, reinforcing ring 21 of closure ring 11 and flanges 22 and 24 of pipes 13 and 14 are provided with apertures 23 suitable for the insertion of bolts 25 secured by nuts 27 to hold the two pipes and the closure ring rigid against the effects of any external stresses.

The width $w_1$ of closure ring 11 is from 5–10 times the thickness T of the ring measured at the crest of the spherical surfaces 16 and 20. The spherical surfaces have their centers 1 and 2 on the common axis of pipes 13 and 14 and ring 11. The width $w_2$ between the crests of the two spherical surfaces 16 and 20 is equal to from about .5 to .75 times $w_1$.

In order to obtain the original interference fit between closure ring 11 and pipes 13 and 14, the diameter $d+\Delta$ of the sealing portion ring 11 measured at the crest of the spherical surface 16 is made slightly greater than the diameter $d$ of sockets 17 and 18. The difference, $\Delta$, is equal to from about .0002 to .0010 times $d$. This difference provides the necessary interference to create plastic flow of surfaces 16 and 20 of segments 15 and 19 in contact with the surfaces of sockets 17 and 18 to give the initial circular seal between pipes 13 and 14 and ring 11. The material of closure ring 11 is chosen so that its Brinell hardness number (reference ASTM Standard Test E 10–61) is from 20–40 points less than the material of pipes 13 and 14 so that the ring will be the deforming member. The material of the pipes and ring is advantageously a steel alloy. The length of segments 15 and 19 is slightly less than the depth $c$ of sockets 17 and 18 with $c$ being 1.01 to 1.05 times as great as the length of segments 15 and 19 which is measured by $(w_1-b)/2$ where $b$ is equal to the width of the reinforcing ring 21. The width of reinforcing ring 21 is equal to from about .1 to .3 times $w_1$. The thickness T which is represented by $$\frac{(d+\Delta)-d_i}{2}$$

is chosen so that it is equal to between about .2 to .4 times D the overall diameter of the pipe 13 but with a $3/32$ inch practical minimum.

Sockets 17 and 18 have bevelled outer edges 28 to avoid distortion of closure ring 11 prior to its being properly seated. The width $x$ between the beginning of the spherical surfaces 16 and 20 and the crest of spherical surface 16 and 20 is chosen to be between about .1 to .2 times $w_1$. The radius of curvature of shoulders 29 is advantageously between about $1/8$ to $3/8$ inch and the radius of fillets 26 is advantageously between about $2/32$ and $5/32$ inches. All sharp edges which are subject to strain are eliminated by the use of these rounded shoulders and fillets.

The closure is assembled by introducing segment 15 into socket 17 of pipe 13 so that face 31 of ring 21 abuts against face 33 of pipe 13 and introducing segment 19 into socket 18 of pipe 14 so that face 32 of ring 21 abuts against face 34 of pipe 14. Bolts 25 are passed through apertures 23 in pipes 13 and 14 and ring 11 and secured by nuts 27. The material of ring 11 at the crests of segments 15 and 19 will be caused to flow against the surface of sockets 17 and 18 to cause the initial seals due to the softer nature of the material and the slightly larger diameter of the sealing segments 15 and 19. As the internal pressure on ring 11 is increased the ring segments 15 and 19 will expand elastically and be forced into more intimate contact with the surface of sockets 17 and 18. Since the area subjected to the internal pressure will always be greater than the area in contact with the surface of sockets 17 and 18, the contact pressure tending to force the segments into contact with the surface of sockets 17 and 18 will always be greater than the internal pressure.

The foregoing has described a novel high pressure closure suitable for joining members which are subjected to pressures in excess of 40,000 p.s.i.g. The novel closure combines the desirable aspects of a self-tightening joint which assures a sealing pressure higher than that of the internal pressure without requiring exact alignment of the omponent parts with the safety features of a joint where the sealing member is completely supported by the two members which are connected.

I claim:

A high pressure self-sealing closure comprising:
(a) a pair of substantially cylindrical sockets located in the ends of two steel members to be joined by said closure; and
(b) a steel closure ring;
   (1) said ring having a pair of spherical sealing surfaces comprised of two substantially spherical sealing segments which are integrally connected to each side of a coaxial reinforcing ring by a pair of curved fillets;
      (a) said segments and said reinforcing ring having a coaxial substantially cylindrical bore;
      (b) said segments having a diameter at the crests of said sealing surfaces which is slightly larger than the diameter of said sockets and said segments having a Brinell hardness number of 20–40 points less than said sockets such that when said segments are assembled in said sockets an interference seal is created between the surfaces of said sockets and the sealing surfaces of said closure ring; and
      (c) the thickness of said closure ring at the crests of said sealing surfaces being between .1 to .2 times the width of said closure ring, the width of said reinforcing ring being between .1 to .3 times the width of said closure ring and the distance between the crests of said sealing surfaces being between .5 to .75 times the width of said closure ring.

References Cited by the Examiner

UNITED STATES PATENTS

| | | | |
|---|---|---|---|
| 1,891,424 | 12/1932 | Kirkpatrick | 277—225 |
| 3,151,674 | 10/1964 | Heller et al. | 277—178 X |
| 3,216,746 | 11/1965 | Watts | 277—225 X |

FOREIGN PATENTS 695,015   8/1953   Great Britain.

LAVERNE D. GEIGER, *Primary Examiner.*

SAMUEL ROTHBERG, *Examiner.*

J. S. MEDNICK, *Assistant Examiner.*